(12) United States Patent
Schweitzer et al.

(10) Patent No.: US 7,826,130 B2
(45) Date of Patent: Nov. 2, 2010

(54) DEVICE FOR THE OPTICAL SPLITTING AND MODULATION OF ELECTROMAGNETIC RADIATION

(75) Inventors: Michael Schweitzer, Mannheim (DE); Joachim Jehle, Heldelberg (DE)

(73) Assignee: Heidelberg Instruments Mikrotechnik GmbH, Heidelberg (DE)

( * ) Notice: Subject to any disclaimer, the term of this patent is extended or adjusted under 35 U.S.C. 154(b) by 3 days.

(21) Appl. No.: 11/991,226

(22) PCT Filed: Aug. 31, 2006

(86) PCT No.: PCT/EP2006/008508

§ 371 (c)(1),
(2), (4) Date: Oct. 31, 2008

(87) PCT Pub. No.: WO2007/025748

PCT Pub. Date: Mar. 8, 2007

(65) Prior Publication Data

US 2009/0073544 A1    Mar. 19, 2009

(30) Foreign Application Priority Data

Aug. 31, 2005   (DE) .................. 10 2005 041 440

(51) Int. Cl.
*G02F 1/33*    (2006.01)
(52) U.S. Cl. ..................................... 359/305
(58) Field of Classification Search ................ 359/305, 359/310, 311, 312, 285, 287, 216, 260, 279; 385/7; 250/585, 587
See application file for complete search history.

(56) References Cited

U.S. PATENT DOCUMENTS

| 4,233,612 | A | 11/1980 | Hirayama et al. ............ 347/137 |
| 4,843,335 | A | 6/1989 | Amano |
| 5,128,693 | A | 7/1992 | Tatemichi et al. |
| 5,587,829 | A | 12/1996 | Alexander et al. |
| 5,890,789 | A | 4/1999 | Inagaki et al. ............... 359/305 |
| 6,037,967 | A | 3/2000 | Allen et al. |
| 2004/0233408 | A1 | 11/2004 | Sievers |
| 2005/0061981 | A1 | 3/2005 | Allen et al. |
| 2005/0067981 | A1 | 3/2005 | Allen et al. |

FOREIGN PATENT DOCUMENTS

| WO | WO-99/03016 | 1/1999 |
| WO | WO-00/52520 | 9/2000 |

*Primary Examiner*—Timothy J Thompson
*Assistant Examiner*—Tuyen Q Tra
(74) *Attorney, Agent, or Firm*—Jordan and Hamburg LLP

(57) ABSTRACT

A device for the optical splitting and modulation of monochromatic coherent electromagnetic radiation, in particular light beams and/or laser beams, contains a beam source, an acousto-optical element disposed downstream of the latter and serving for splitting the beam generated by means of the beam source into a number of partial beams, a modulator and also a signal generator for applying to the acousto-optical element an electrical signal for splitting the beam. The device is intended to be developed to the effect that in conjunction with a simple and functionally reliable construction and independently of the number of beams emitted by the beam source, the intensity of the individual split partial beams can be kept constant. For this purpose, it is proposed that the modulator is embodied as an acousto-optical modulator disposed downstream of the acousto-optical element, and that the acousto-optical modulator is fed the split partial beams for modulation, and the acousto-optical modulator can be driven with additional high-frequency electrical signals.

19 Claims, 2 Drawing Sheets

DEVICE FOR THE OPTICAL SPLITTING AND MODULATION OF ELECTROMAGNETIC RADIATION

BACKGROUND OF THE INVENTION

The invention relates to a device for optical splitting and modulation of electromagnetic radiation, in particular monochromatic coherent radiation, in particular light beams and/or laser beams.

Such devices are employed for optical splitting of beams, in particular light beams and/or laser beams, for instance as optical switches or optical modulators, such as primarily in laser printers or lithography systems. Such devices, in which a beam and/or light, e.g. a laser beam, is split into a plurality of beams using an acousto-optic element, the acousto-optic element being controlled by a plurality of electrical signals having different frequencies in order to divide the beam into different beams, make it possible, e.g. when employing laser printers or lithography machines, to influence a plurality of laser beams, both in terms of their energy and their position, which means a substantial advantage in terms of speed compared to conventional machines that work with only a single laser beam. Despite this, a number of problems occur when using an acousto-optic element for generating a plurality of laser beams. One of the biggest problems is that the energy of the beams diffracted in an acousto-optic element varies with the number of beams produced and thus with the number of the frequencies applied to the acousto-optic element, which leads to a change in the individual beam energies. In addition, a temporal change in the beam energies occurs in that, when using a plurality of frequencies that are fed into an acousto-optic element simultaneously, beats occur between the individual frequencies, which leads to periodic energy fluctuations in the individual beams. The quality of the machines suffers significant negative effects due to these phenomena.

Thus for instance the problem can occur that the amplitudes of an electrical signal do not change linearly in an acousto-optic element and in addition periodic changes in the signal amplitudes occur due to beat effects in the individual frequencies. This leads to great complexity in terms of the accuracy and the speed of amplitude control, which makes it nearly impossible to perform in situ control of the beam energies via signal amplitudes. In addition, non-linear optical and electronic effects that occur due to the superimposition of the individual frequencies lead to the occurrence of higher-order beat frequencies that generate additional diffracted laser beams and that interfere with the writing and exposure processes in a laser printer or laser lithography system.

Known from U.S. Pat. No. 5,890,789 is such a device that contains as the radiation source of monochromatic coherent electromagnetic radiation a laser source, the light or laser beam of which is split into a plurality of beams using an acousto-optic element, the acousto-optic element being controlled by a plurality of electrical signals having different frequencies in order to divide or split the laser beam into different beams. For this, a signal generator, an image processor, a modulation circuit, and an intensity-control circuit are provided in order, first, to make it possible to split the laser beam into a plurality of beams, and second, to keep constant the energy of the beams produced. The intensity-control circuit controls the light intensity of the laser source as a function of the number of beams to be produced and ensures that the light intensity of the laser source is proportional to the number of beams produced so that their intensities can be kept constant, regardless of the number of laser beams produced. By keeping the intensities of the individual laser beams constant by regulating the laser source, it is supposed to be possible to keep constant the amplitude signals of the electrical signals for the aforesaid signal generator and thus to prevent changes in the beat behavior of the acousto-optic system due to a change in amplitude. However, in the aforesaid device the problem occurs that, for one thing, the regulation of the laser source at a high speed, as is required for instance in commercial laser lithography systems, is only possible for very few types of lasers, and therefore the employability of the device is very limited. For another thing, the effect explained in the foregoing is retained that, higher-order beat frequencies occur in the acousto-optic element due to superimposition of the individual frequencies and produce additional diffracted laser beams that influence laser energy periodically and interfere with the writing and exposure processes, for instance in a laser printer or laser lithography system.

In one alternative embodiment in U.S. Pat. No. 5,890,789, a mechanical shutting member is provided, by means of which a plurality of successive beams can be shut out in order to split the laser beam into a plurality of beams and to keep constant the energy of the beams produced. In this case, regardless of the number of beams that are used for writing a data set, for instance in a laser printer or laser lithography system, the number of frequencies applied to the acousto-optic element is to be kept constant using the shutting member to shut out beams that are not used and thereby the intensities of the beams used are to be kept constant regardless of the number of laser beams produced. However, this leads to other problems that interfere with the writing and exposure processes, for instance in a laser printer or laser lithography system. Due to the higher number of frequencies used, the beat phenomena described in the foregoing are amplified and, due to the increased number of combination possibilities for the different frequencies, even compounded. What this leads to is that the intensities of the individual laser beams do not remain periodically constant across the temporal course of the scan and thus it is not possible to ensure constant uniform energy distribution for the beams that have been split off.

Furthermore, the problem can occur that even slight differences between the laser source and an additional beam source, e.g. in terms of wavelength, lead to a difference in terms of the Bragg angle of the diffracted beam, which leads to a shift in the focal point for the laser beam and interferes with the writing and exposure processes in a laser printer or laser lithography system.

Even if a correction signal is calculated as a function of the number of laser beams used, the effect is retained that, due to the superimposition of the individual frequencies, beat phenomena occur that produce a temporal energy fluctuation regardless of the number of laser beams used and thus interfere with the writing and exposure processes in a laser printer or laser lithography system.

SUMMARY OF THE INVENTION

The underlying object of the invention is therefore to further develop the device of the aforesaid type and furthermore a related method such that the problems and difficulties discussed are provided an improved solution. The device should furthermore have a simple and functionally reliable structure and/or should ensure that the intensity of the individual beams can be kept constant regardless of the number of emitted beams.

Moreover, it should be possible to adjust the spacing of the beams produced independent of one another.

In addition, it should be possible to vary, independent of one another, the phases of the beams produced.

Moreover it should be possible for the splitting procedure and the modulation procedure to be performed at optical path points that are disposed independent of one another and/or to be performed locally spaced apart from one another.

It should also be possible for the splitting procedure and the modulation procedure to be performed via an electronic control in a fixed temporal relationship to one another.

The inventive device makes it possible, with a low degree of structural complexity but with high functional reliability, to split the beams emitted by a radiation source, in particular a light source and/or a laser source, into a desired number of beams at a desired pre-specifiable distance from one another. The advantages and functional relationships explained in the following also apply analogously for the inventive method. The device contains and the method uses an acousto-optic element that is operated with a plurality and/or pre-specified number of electrical signals having different frequencies in order to split the beams emitted by the radiation source into a plurality and/or pre-specified number of beams. Furthermore, a signal generator is provided that produces the electrical signals having the different frequencies that the acousto-optic element requires, and also provided are a circuit that makes it possible to regulate the intensities of the individual laser beams, an optical system that reproduces the split beams focused in an acousto-optic modulator, and a circuit that makes it possible to modulate beams focussed in the acousto-optic modulator. Also provided is a circuit that makes it possible to regulate the intensities of the individual light beams after the modulation, and preferably a trigger circuit that makes it possible to temporally align the individual processes in the acousto-optic components, in particular via the two signal generators downstream of the trigger circuit.

The inventive device in particular contains the following components that, in the framework of the invention, can be exchanged with other components having largely the same functionality and/or that can be combined with one another all together, or in special cases in part, in a manner appropriate to the situation:

- An acousto-optic element that is operated with a plurality of electrical signals having different and/or pre-specifiable frequencies in order to split the monochromatic coherent electromagnetic radiation emitted by a radiation source, in particular light from a laser source, into a plurality of beams;
- A signal generator that produces the electrical signals having the various frequencies that the acousto-optic element requires;
- A circuit that makes it possible to regulate and/or control the intensities of the individual beams, in particular laser beams, in the acousto-optic element, hereinafter called the intensity-control circuit;
- A circuit that makes it possible to regulate and/or control the phases of the individual frequencies relative to one another in the acousto-optic element, hereinafter called the phase modulation circuit;
- An optical system that reproduces the split beams, in particular laser beams, preferably in a focussed manner.
- An acousto-optic modulator that makes it possible to modulate, separately from one another, the individual, preferably focussed partial beams, in particular laser beams, via a circuit that is fed by another signal generator;
- A circuit that makes it possible to regulate and/or control the intensities of the individual beams, in particular laser beams, during the modulation, hereinafter also called an intensity-control circuit;
- A trigger circuit that makes it possible to temporally align and/or synchronize with one another the individual processes in the acousto-optic element and in the acousto-optic modulator.

In accordance with the invention, a desired number of beams, in particular laser beams, are produced, initially separate from the actual modulation process, in order to optimize them in terms of energy by adjusting intensity and/or phase. Although this does not make it possible to prevent any beat processes, due to the temporal alignment via a trigger process, energy deviations because of beats between the different frequencies always occur at the same point in time after a trigger signal. The consequence of this is that although a temporal energy fluctuation occurs between the different frequencies due to the beat, it always occurs at the same point in time with the same strength after the trigger signal.

This makes it possible to regulate the temporal fluctuation of the energy, based on the beat between the different frequencies in the acousto-optic element, in the downstream acousto-optic modulator using the intensity-control circuit. Since the time in which a laser beam is scanned, e.g. in a laser printer or laser lithography system, is determined by the scanning area, both the time period between two trigger signals and the length of the triggers signals is fixed. Therefore the correction of the temporal fluctuation in the energy that is performed in the downstream acousto-optic modulator only has to be adjusted once and thereafter can inventively be repeated periodically with the trigger signal. Therefore it is not necessary to record the temporal fluctuation in the energy during the entire printing and exposure process or other processes in the specific case, and there is no complex energy recording in situ.

Special further developments and embodiments are provided in the subordinate claims and in the following description of a special exemplary embodiment of the invention and apply analogously for the inventive method.

BRIEF DESCRIPTION OF THE DRAWINGS

The invention shall be explained in the following using the exemplary embodiment depicted in the drawings, without this resulting in any restriction.

FIG. 1 depicts the inventive device for splitting and modulating beams, having a radiation source 2 by means of which monochromatic coherent electromagnetic radiation is produced. The radiation source and/or light source is in particular embodied as a laser source with a desired pre-specifiable laser wavelength. Although for the sake of simplicity only a laser source or laser light is described in the following, it is expressly stated that this does not result in any restriction of the invention. The laser beam 4 is injected via a lens or a lens system or in general an optical system 6 into an acousto-optic element 8 that comprises a material that is matched to the laser source 2, such as e.g. a quartz crystal, $TeO_2$, $ZnO$, $LiNbO_3$, $PbMoO_4$, $As_2O_3$, $GaAs$, etc. The lens system 6 can preferably be selected and/or embodied such that it satisfies the optimum conditions for the use of an acousto-optic element 8 in terms of beam diameter, beam shape, etc.

Figure 1:
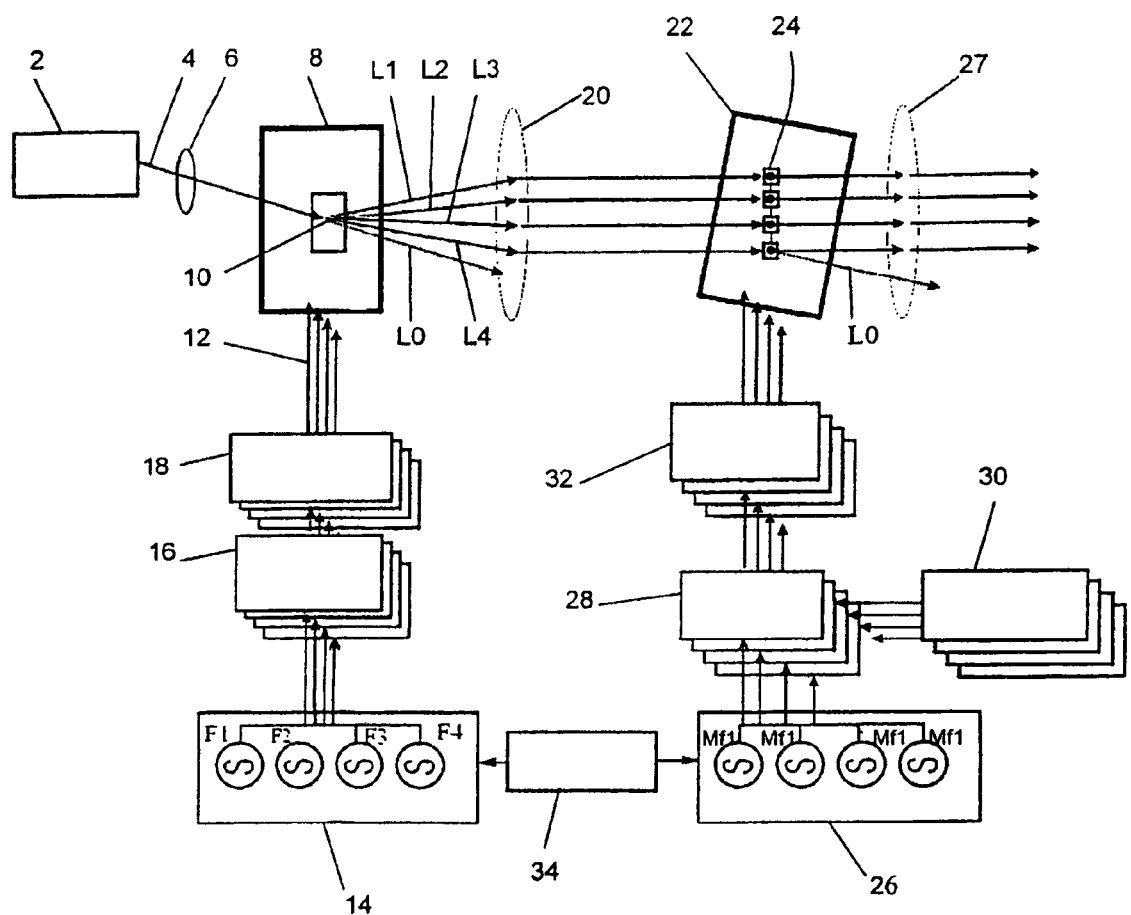
FIG. 1 depicts the principle of the device and a special application thereof.

The crystal for the element 8 is connected to a signal transmitter 10 that makes it possible to feed into the crystal a plurality of high-frequency electrical signals 12 having different frequencies that are produced by a high frequency signal generator 14. The high frequency electrical signals produce acoustic waves in the crystal that change the refractive index of the material periodically as a function of their frequency and thus produce a diffraction grid. When the radiated laser beam passes through the area of the crystal in which the acoustic waves are produced, there is acousto-optic interaction between the laser beam 4 and the acoustic waves, which ultimately leads to diffraction of the radiated laser beam 4. The strength of the diffraction of the laser beam 4 depends on the wavelength of the frequency fed into the crystal in accordance with the so-called Bragg condition. The Bragg condition states that when light with wavelength $\lambda$ is scattered on a grid with the grid constant d, in this case the diffraction grid that is produced by the acousto-optic waves, at an angle $\Theta$ the light is diffracted in accordance with the Bragg relationship $n\lambda = 2d \sin \Theta$ (n stands for any natural number).

If a plurality of acoustic frequencies are applied to the acousto-optic element 8, for instance four frequencies, as many as desired being possible of course, this leads to splitting of the incident laser beam 4 in accordance with the number of frequencies fed in. In addition, another beam L0 (zero order beam) occurs that runs on the path of the undiffracted laser beam 4 and can be shut out because it is meaningless for the application. As depicted, four electrical signals F1, F2, F3, F4 are produced by the signal generator 14, which leads to the laser beam splitting into four partial beams L1, L2, L3, L4 and the beam L0. In accordance with the Bragg condition, the frequency of the electrical signals fed in determines the angle for the splitting of the laser beams. It is also possible, however, to regulate the strength or intensities of the beams L1, L2, L3, L4 that have been produced by regulating the amplitudes of the frequencies used by means of an intensity-control circuit 16.

So-called beat phenomena always occur when a plurality of different frequencies are superimposed. If e.g. oscillations of two frequencies that are not very different are superimposed, the amplitude of the superimposed oscillation changes periodically with the so-called beat frequency. When a plurality of frequencies are superimposed, in the application described above this leads to a temporal change in the signal amplitudes of the individual partial beams L1, L2, L3, L4. In order to reduce this effect, a phase modulation circuit 18 that makes it possible to shift the phases of the individual frequencies independently and coupled to one another is also employed for intensity-control in a preferred manner between the signal generator 14 and the element 8 in order to minimize the temporal fluctuation in the signal amplitudes for the individual partial beams L1, L2, L3, L4.

Thereafter the partial laser beams L1, L2, L3, L4 produced by means of the acousto-optic element 8 strike a second lens or a second lens system or an optical system 20, the focal distance of which equals the distance between the center point of the lens and the center of the acoustic wave front in the acousto-optic element 8. Due to this optical arrangement, four laser beams occur behind the lens 20, and their spacing is largely a function only of the focal distance of the lens 20 or the optical system and the frequency separation of the electrical signals. By changing the frequency separation of the electrical signals it is therefore possible to vary the spacing of the beams L1, L2, L3, L4. These four partial laser beams are reproduced, focused, behind the lens 20 at a distance of the focal distance of the lens 20. Disposed at this location, as illustrated, is an acousto-optic modulator 22. The acousto-optic modulator 22 is equipped with four signal transmitters 24, whose spacing is adjusted to the beam spacing for the partial beams L1, L2, L3, L4 and that make it possible to each feed into the crystal one high frequency electrical signal of the same frequency that is produced by a second high frequency signal generator 22. In the framework of the invention, four separate acousto-optic modulators, each having a signal transmitter and an acousto-optic crystal, can be used instead of the acousto-optic modulator 22 having four signal transmitters. It is particularly significant that the acousto-optic modulator 22 is arranged at a pre-specified distance from the acousto-optic element 8 so that the splitting into partial beams on the one hand and the modulation thereof on the other hand can be performed independent of one another, the optical system 20 preferably being arranged in the beam path between the acousto-optic element 8 and the acousto-optic modulator 22.

The acousto-optic modulator 22 functions like the acousto-optic element 8 and it comprises a material that is matched to the wavelength of the laser source 2, such as e.g. a quartz crystal, $TeO_2$, ZnO, $LiNbO_3$, $PbMoO_4$, $As_2O_3$, GaAs, etc. The high frequency electrical signals produce in the crystal acoustic waves that change the refractive index of the material periodically as a function of their frequency and thus produce a diffraction grid. When the radiated partial laser beams L1, L2, L3, L4 pass through the area of the crystal in which the acoustic waves are produced, there is acousto-optic interaction between the respective partial beam and the acoustic waves, which ultimately leads to diffraction of the radiated partial beams. The strength of the diffraction of the laser beam is a function of the wavelength and the amplitude of the frequencies fed into the crystal. In addition, another zero order beam L0 re-occurs per signal transmitter and can be shut out because it is meaningless for the application. Another lens or lens system 27 is downstream of the modulator 22.

The signals produced in the high frequency signal generator 26 are inventively produced by means of a single or of a few clock generators in order to ensure that both the frequency and the phase of the four high frequency electrical signals Mf1 that are produced for the four signal transmitters 24 are in agreement. In the application described, the acousto-optic modulator 22 is used as a switch that makes it possible e.g. in laser printers or laser lithography machines, to turn the laser beams on and off at a high speed that is a function only of the frequency of the electrical signal produced by the signal generator 26 (normally in the high MHz range). The turning on and off process is regulated via a modulation circuit 28 that is controlled via an image processor 30 that supplies an image signal. In this manner the structures to be reproduced for instance in a laser printer or laser lithography machine can be forwarded to a scanner that ultimately produces the structure to be reproduced.

Since there can be deviations in the intensity distribution of the beams L1, L2, L3, L4 due to minor deviations in the optical components and the different optical paths that the beams travel in the device, the energy of each of the individual beams in the acousto-optic modulator 22 can also be regulated via an intensity-control circuit 32. An additional trigger circuit 34 also inventively makes it possible to temporally align and/or synchronize the processes in the acousto-optic element 8 and in the acousto-optic modulator 22 with one another. In modern laser printers and laser lithography systems, the time period that an individual laser scan requires is fixed by the scanning element. This means that scans of the same length, i.e. the same temporal interval, are initiated over and over at a fixed periodic interval. The inventive device makes use of this. Initially the energies of the laser beams L1, L2, L3, L4 split in the acousto-optic element 8 are matched to one another by means of the intensity-control circuit 16 so that four laser beams L1, L2, L3, L4 having the same energy are produced. Based on the beat phenomena described in the foregoing, these four laser beams have a temporal energy fluctuation that can be minimized using the phase modulation circuit 18. Since the acousto-optic element 8 is always switched periodically at the same time interval via the trigger circuit 34, the beat phenomena and the energy fluctuation associated therewith always occur at the same point in time after a trigger signal has been initiated. This makes it possible to control the energy of the individual beams L1, L2, L3, L4 via the acousto-optic modulator 22, which is also controlled and/or synchronized via the trigger circuit 34, and thus to produce four modulatable laser beams having constant equal energy.

Figure 2:
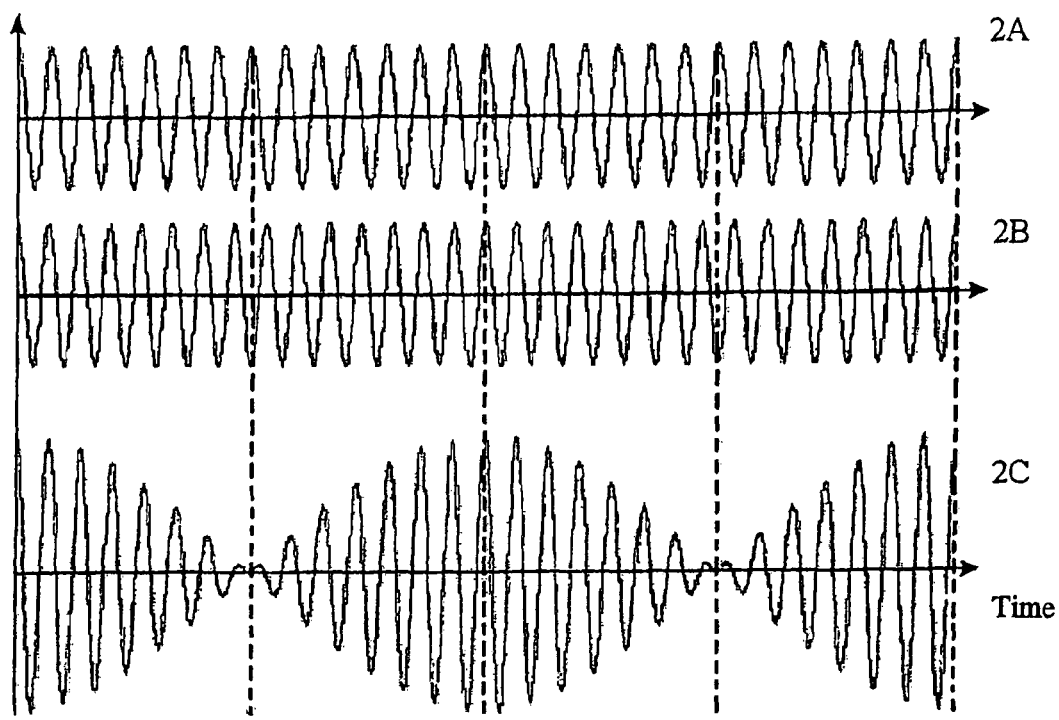
FIG. 2 provides diagrams and lines 2A through 2F for oscillations with different frequencies, frequency amplitudes and radiation energy being tracked over time.
Figure 2:
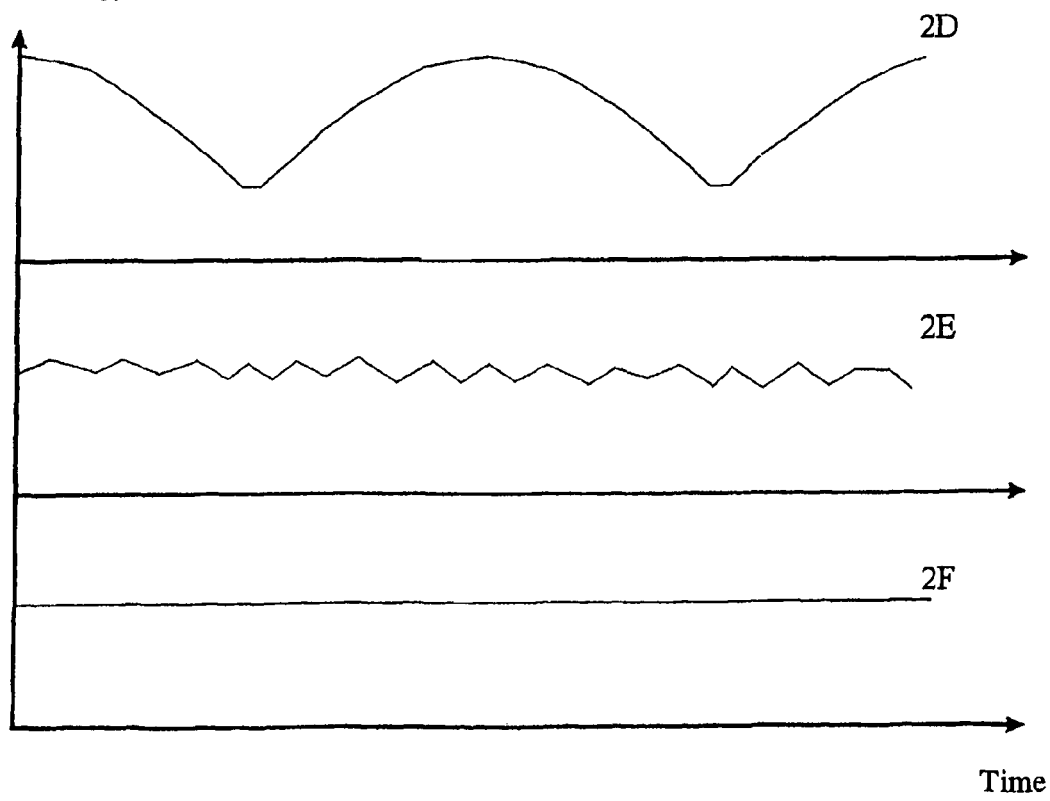

FIG. 2 depicts the entire process of the occurrence of the beat effects and the correction of these effects using the various circuits depicted in FIG. 1, in a simplified manner for the simplified case of two frequencies. The inventive functionality remains the same for any desired number of frequencies used, however. The lines 2A and 2B indicate two oscillations of two frequencies that are similar. If these oscillations are superimposed, the amplitude of the superimposition oscillation in accordance with line 2C changes periodically with the so-called beat frequency, and periodic maximums and minimums for the frequency amplitude occur. As a consequence, the laser beams occurring in accordance with FIG. 1 behind the acousto-optic element 8 have an energy fluctuation in accordance with the frequency beat, i.e. the energy of the individual beams fluctuates periodically as depicted with the line 2D. Using the phase modulation circuit 18 it is possible to shift the phases of the individual frequencies relative to one another and thus to minimize the fluctuations in the frequency amplitudes and laser energies. The same effect is also attained with the intensity-control circuit 16 with which the frequency amplitude of each individual frequency can be intentionally changed such that the fluctuations in the superimposition oscillation, and thus the energy fluctuations for the individual beams, can be minimized. The corrections by means of the phase modulation circuit 18 and/or the intensity-control circuit 16 thus make it possible to keep the energy of the individual beams nearly constant across the entire time period apart from minor energy fluctuations, in accordance with line 2E. Since the control of the acousto-optic element 8 is regulated by means of a trigger circuit 34, the minor energy fluctuations depicted in line 2E always occur at the same time after the trigger signal, i.e. the fluctuations are temporally precisely determined. This makes it possible to correct the fluctuations using the downstream acousto-optic modulator 22 and/or the intensity-control circuit 32, which is also inventively regulated or controlled via the trigger circuit 34. Finally, beams having constant energy are produced by means of this correction, and they do not have any temporal energy fluctuation, as is depicted with line 2F.

The invention has significant advantages over devices for splitting and modulating laser beams that have only a single acousto-optic element in which the laser beams are split and modulated at the same time. In particular what is attained is that no periodically recurring signal is produced during the splitting process so that the beat phenomena and the energy distribution for the individual laser beams change constantly and unpredictably due to the constantly temporally changing sequence of the splitting and the changing number of frequencies applied. An in situ recording of the energy for the individual beams or a proportional variable was required in the past, and this was associated with significant technical complexity. This complexity is no longer required in the device for splitting and modulating laser beams as described using FIG. 1. Since the energy fluctuations of the individual beams L1, L2, L3, L4 always occur periodically at the same temporal interval after the trigger signal, the energy fluctuations that occur for the individual beams must be measured only once and corrected by means of the intensity-control circuit 32. This correction can then be fed, temporally correlated using the trigger signal of the trigger circuit 34, again and again into the acousto-optic modulator 22 so that in situ recording of the energy fluctuations for the individual beams L1, L2, L3, L4 becomes superfluous. Another advantage of the invention described using FIG. 1 is comprised in that the locations in which the laser beam is split (the acousto-optic element 8) and the individual beams are modulated (the acousto-optic modulator 22) are separated from one another geometrically. This makes it possible to use a suitable selection of lens systems 6, 20, 27 to optimally match the beam path to the optical conditions necessary for illuminating acousto-optic element 8 and/or the acousto-optic modulator 22. This is not possible in systems in which the splitting process and the modulation process occur in one step, so that it is always necessary to find a compromise among the individual optical conditions, which leads to diminished effectiveness for the individual acousto-optic components.

Although the present invention can be used in the application described in the foregoing for laser printing and laser lithography, there are a number of other application areas in which the device described in the foregoing and the present invention can be used.

The described device for splitting and modulating beams, in particular laser beams, can also be employed for splitting light into parallel light beams that can be switched independent of one another and that have adjustable energy, and injecting them into in optical systems such as e.g. a fiberglass system for data transmission, in particular by means of the additional lens system 27.

The described device for splitting and modulating laser beams can also be employed for splitting light into parallel light beams that can be switched independent of one another and that have adjustable energy, and injecting them into in optical systems such as e.g. laser-active media in order to excite the emission of a plurality of parallel laser beams.

Although the present invention can be used in the aforesaid applications, there are also a number of changes and modifications for the invention that are possible that are included in the present invention.

In the invention described in the foregoing it is not absolutely necessary for the acousto-optic components to be made of massive crystals; thin films made of the same optically active materials can also be used such as can be produced e.g. using a laser ablation method or other methods for producing thin films.

In the invention described in the foregoing it is not absolutely necessary for the incident laser beam to split into four partial beams; on the contrary, the laser beam can be split into any desired number of beams. The number of high-frequency electrical signals increases according to the number of partial beams. Depending on the number of partial beams produced, it is also possible to modulate a desired number of partial beams by means of the acousto-optic modulator. The number of high frequency electrical signals and of signal transmitters used increases according to the number of partial beams.

Finally, it is expressly stated that it is not absolutely necessary to use laser light in the invention described in the foregoing. Any monochromatic coherent electromagnetic radiation can be split and modulated in this manner as long as the material of the optical components is matched to the wavelength of the electromagnetic radiation.

The invention claimed is:

1. Apparatus for optical splitting and modulation of monochromatic coherent electromagnetic radiation, comprising:
    a beam source of a beam of said radiation,
    an acousto-optic element arranged downstream of the beam source configured to split the beam produced by said beam source into a plurality of partial beams,
    an acousto-optic modulator arranged downstream of said acousto-optic element, said partial beams being supplied to said acousto-optic modulator for modulation,
    a first high frequency signal generator producing first high frequency electrical signals applied to said acousto-optic element for splitting said beam respectively into said plurality of partial beams,
    a phase modulation circuit between the first high frequency signal generator and the acousto-optic element transferring said first high frequency electrical signals to said acousto-optic element, the phase modulation circuit being configured to effect shifting respective phases of said first high frequency electrical signals at least one of independently or coupled together such that fluctuations of amplitudes of the individual partial beams are minimized; and
    said acousto-optic modulator being controllable with second high frequency electrical signals which are not said first high frequency electrical signals.

2. Apparatus in accordance with claim 1, further comprising an optical system arranged in the beam path between said acousto-optic element and said acousto-optic modulator for focusing said partial beams in or on said acousto-optic modulator.

3. Apparatus in accordance with claim 1, wherein said acousto-optic modulator comprises signal transmitters, the spacing of said signal transmitters being matched to the spacing of said partial beams.

4. Apparatus in accordance with claim 3, wherein said acousto-optic modulator comprises a plurality of acousto-optic modulators, each of said acousto-optic modulators comprising at least one of said signal transmitters.

5. Apparatus in accordance with claim 1, further comprising a second high frequency signal generator for producing said second high frequency electrical signals applied to and controlling said acousto-optic modulator.

6. Apparatus in accordance with claim 5, further comprising a modulation circuit and an image processor, the modulation circuit being arranged between said second high frequency signal generator and said acousto-optic modulator to modulate said second high frequency signals, and image signals from said image processor being supplied to said modulation circuit to control modulation of said second high frequency signals.

7. Apparatus in accordance with claim 6, further comprising a trigger circuit for controlling both said first and second high frequency signal generators, said first high frequency electrical signals having different frequencies from each other to control said acousto-optic element to split the beam into said plurality of partial beams.

8. Apparatus in accordance with claim 7, wherein said trigger circuit is for temporally aligning and/or synchronizing functioning of said acousto-optic element and said acousto-optic modulator.

9. Apparatus in accordance with claim 5, further comprising a single clock generator for both said first and second high frequency signal generators whereby the signals from both of said first and second high frequency signal generators agree in frequency and phase position.

10. Apparatus in accordance with claim 5, further comprising an intensity control circuit arranged between said second signal generator and said acoustic-optic modulator and configured to control amplitudes of said second high frequency electrical signals applied to said acoustic-optic modulator.

11. Apparatus in accordance with claim 1, wherein said beam source is a light beam source or a laser beam source.

12. Apparatus in accordance with claim 11, further comprising an optical system arranged in the beam path between said acousto-optic element and said acousto-optic modulator for focusing said partial beams in or on said acousto-optic modulator.

13. Apparatus in accordance with claim 11, wherein said acousto-optic modulator comprises signal transmitters, the spacing of said signal transmitters being matched to the spacing of said partial beams.

14. Apparatus in accordance with claim 11, further comprising a second high frequency signal generator for producing said second high frequency electrical signals applied to and controlling said acousto-optic modulator.

15. Apparatus in accordance with claim 14, further comprising a modulation circuit and an image processor, the modulation circuit being arranged between said second high frequency signal generator and said acousto-optic modulator to modulate said second high frequency signals, and image signals from said image processor being supplied to said modulation circuit to control modulation of said second high frequency signals.

16. Apparatus in accordance with claim 15, further comprising a trigger circuit for controlling both said first and second high frequency signal generators, said first high frequency electrical signals having different frequencies from each other to control said acousto-optic element to split the beam into said plurality of partial beams.

17. Apparatus in accordance with claim 16, wherein said trigger circuit is for temporally aligning and/or synchronizing functioning of said acousto-optic element and said acousto-optic modulator.

18. Apparatus in accordance with claim 1, further comprising, arranged between the first signal generator and the acousto-optic element, a circuit for controlling intensity of said first high frequency electrical signals generated by said first signal generator applied to said acoustic-optic element.

19. Method for optically splitting and modulating coherent electromagnetic radiation, comprising;
    producing a beam of said radiation,
    splitting said beam into a plurality of partial beams by means of an acousto-optic element which is actuated by first high frequency signals,
    providing an acousto-optic modulator arranged downstream of said acousto-optic element, said partial beams being supplied to said acousto-optic modulator for modulation,
    providing a first high frequency signal generator producing said first high frequency electrical signals applied to said acousto-optic element for splitting said beam respectively into said plurality of partial beams, providing a phase modulation circuit between the first high frequency signal generator and the acousto-optic element transferring said first high frequency electrical signals to said acousto-optic element, operating the phase modulation circuit to effect shifting respective phases of said first high frequency electrical signals at least one of independently or coupled together such that fluctuations of amplitudes of the individual partial beams are minimized; and controlling said acousto-optic modulator with second high frequency electrical signals which are not said first high frequency electrical signals.

* * * * *